(12) United States Patent
Zhu et al.

(10) Patent No.: US 10,816,794 B2
(45) Date of Patent: Oct. 27, 2020

(54) METHOD FOR DESIGNING ILLUMINATION SYSTEM WITH FREEFORM SURFACE

(71) Applicants: Tsinghua University, Beijing (CN); HON HAI PRECISION INDUSTRY CO., LTD., New Taipei (TW)

(72) Inventors: Jun Zhu, Beijing (CN); Xiao-Fei Wu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 591 days.

(21) Appl. No.: 15/721,745

(22) Filed: Sep. 30, 2017

(65) Prior Publication Data

US 2018/0210325 A1  Jul. 26, 2018

(30) Foreign Application Priority Data

Jan. 24, 2017  (CN) .......................... 2017 1 0059419

(51) Int. Cl.
*G02B 27/00* (2006.01)
*G02B 3/00* (2006.01)

(52) U.S. Cl.
CPC ....... *G02B 27/0012* (2013.01); *G02B 3/0068* (2013.01)

(58) Field of Classification Search
None
See application file for complete search history.

(56) References Cited

U.S. PATENT DOCUMENTS

| 10,527,255 | B2* | 1/2020 | Zhu ......................... F21V 5/04 |
| 2009/0168414 | A1 | 7/2009 | Bailey |
| 2012/0113404 | A1* | 5/2012 | Hsu ..................... G03F 7/70125 |
| | | | 355/67 |
| 2016/0232718 | A1* | 8/2016 | Zhu ......................... G06T 17/00 |
| 2018/0199017 | A1* | 7/2018 | Michaelis .......... G02B 27/0955 |

* cited by examiner

*Primary Examiner* — David Orange
(74) *Attorney, Agent, or Firm* — ScienBiziP, P.C.

(57) ABSTRACT

A method for designing illumination system with freeform surface, the method comprising: presupposing a plurality of expected light spots; establishing an initial system, wherein the initial system comprises a plurality of collimated light sources, a plane lens and a target plane; designing a sphere lens to replace the plane lens, and obtaining a before-construction-iteration illumination system; selecting a plurality of feature rays and obtaining a plurality of target points; taking the before-construction-iteration illumination system as an initial construction-iteration system, and obtaining an after-construction-iteration illumination system with freeform surface by making multiple construction-iteration, wherein the illumination system with freeform surface is configured to form the plurality of expected light spots.

17 Claims, 9 Drawing Sheets

METHOD FOR DESIGNING ILLUMINATION SYSTEM WITH FREEFORM SURFACE

CROSS-REFERENCE TO RELATED APPLICATIONS

This application claims all benefits accruing under 35 U.S.C. § 119 from China Patent Application No. 201710059419.8, filed to Jan. 24, 2017, in the China Intellectual Property Office, the disclosure of which is incorporated herein by reference. The application is also related to copending application Ser. No. 15/787,718 entitled, "ILLUMINATION SYSTEM WITH FREEFORM SURFACE", filed Oct. 19, 2017.

FIELD

The subject matter herein generally relates to a method for designing illumination system with freeform surface.

BACKGROUND

Compared with conventional rotational symmetric surfaces, a freeform surface has larger degrees of freedom, which can accurately control light path. In recent years, freeform surfaces have been successfully used in illumination system, which can obtain a better illumination effect and a compact structure.

However, the conventional illumination system with freeform surface is designed for a single light source. The light source is unique and immovable. When the single light source is moved or other light sources are introduced, illumination effect of the illumination system with freeform surface is decreased.

What is needed, therefore, is to provide a method for designing an illumination system with freeform surface, which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
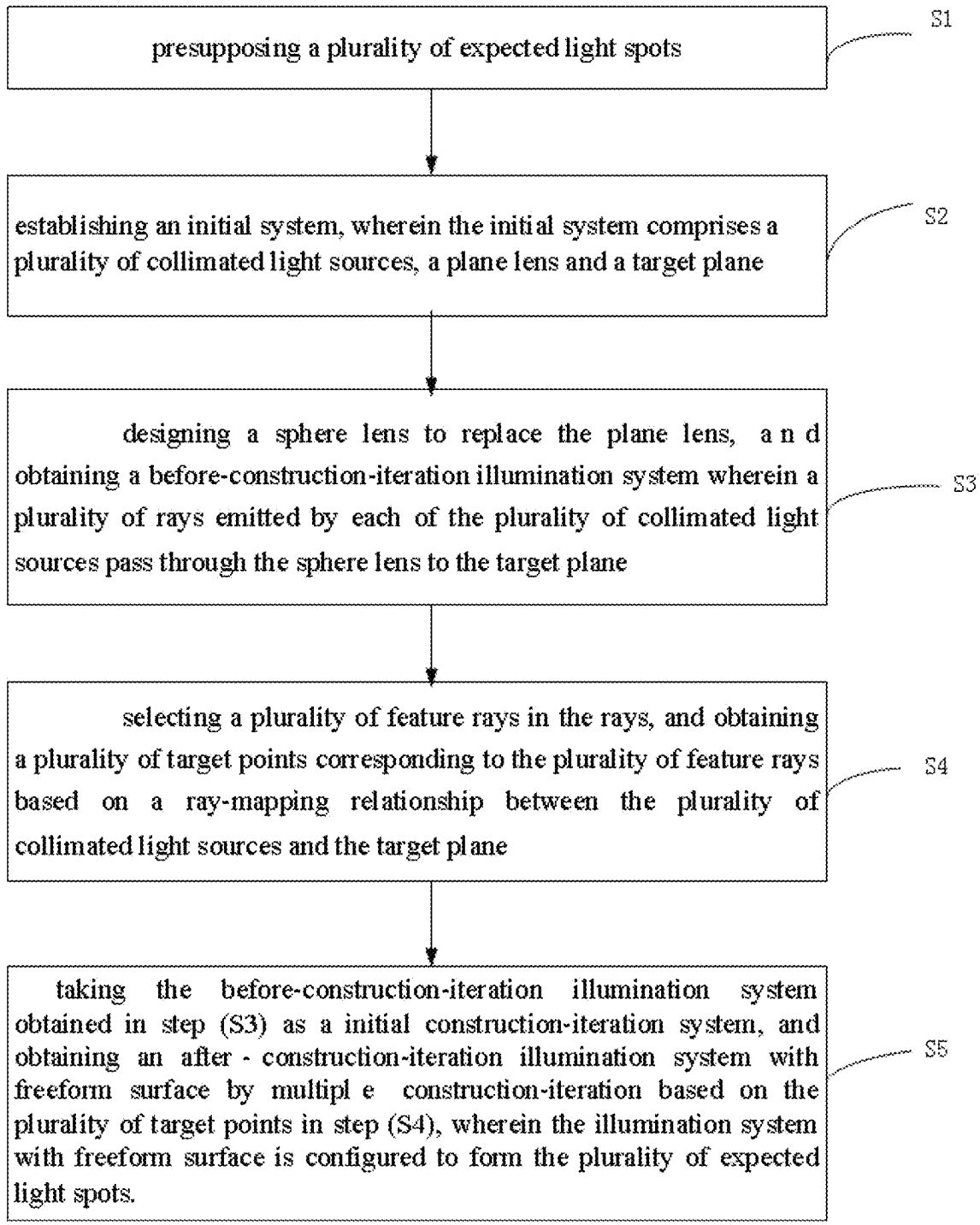
FIG. 1 is a flow chart of a method for designing the illumination system with freeform surface.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape or other word that substantially modifies, such that the component need not be exact. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

The present disclosure relates to a method for designing an illumination system with freeform surface described in detail as below.

Referring to FIG. 1, a method for designing illumination system with freeform surface according to one embodiment is provided. The method comprises the following steps:

step (S1), presupposing a plurality of expected light spots;

step (S2), establishing an initial system, wherein the initial system comprises a plurality of collimated light sources, a plane lens and a target plane;

step (S3), designing a sphere lens to replace the plane lens to obtain a before-construction-iteration illumination system, wherein a plurality of rays emitted by each of the plurality of collimated light sources pass through the sphere lens to the target plane;

step (S4), selecting a plurality of feature rays in the plurality of rays, and obtaining a plurality of target points corresponding to the plurality of feature rays based on a ray-mapping relationship between the plurality of collimated light sources and the target plane;

step (S5), taking the before-construction-iteration illumination system obtained in step (S3) as an initial construction-iteration system, and obtaining an after-construction-iteration illumination system with freeform surface by making multiple constructions-iterations based on the plurality of target points in step (S4), wherein the illumination system with freeform surface is configured to form the plurality of expected light spots.

Figure 2:
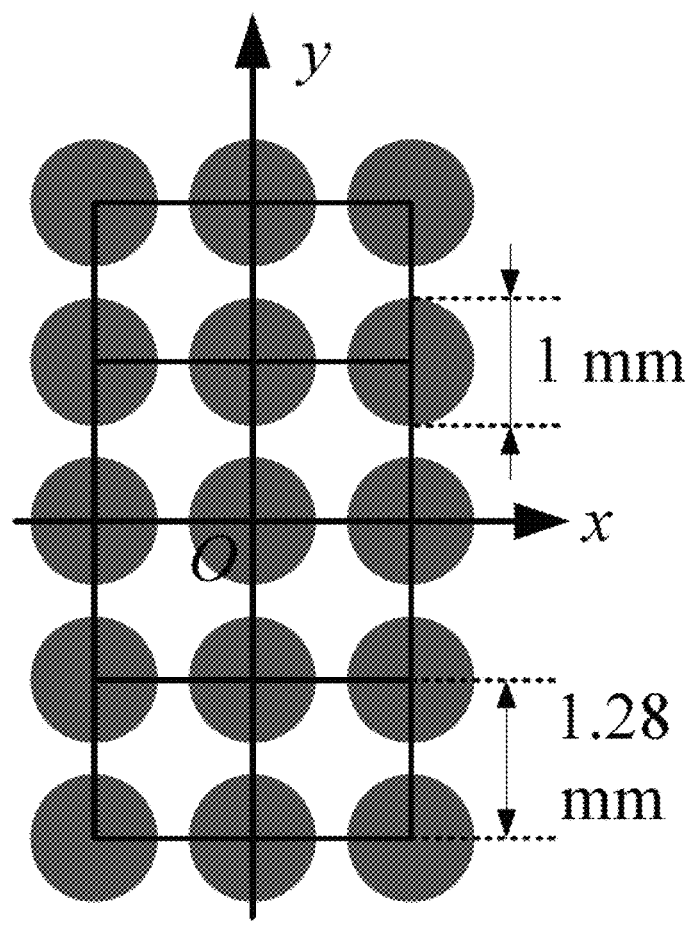
FIG. 2 is a distribution schematic view of one embodiment of a plurality of expected light spots.

In step (S1), referring FIG. 2, the plurality of expected light spots have the same parameters, such as, shape, size and illuminance distribution. Each parameter of the plurality of expected light spots is not limited. In one embodiment, a shape of each of the plurality of expected light spots is circular. A diameter of each of the plurality of expected light spots is one millimeter. A distance between adjacent expected light spots is 1.28 millimeters. Each of the plurality of expected light spots has uniform illumination distribution.

Figure 3:
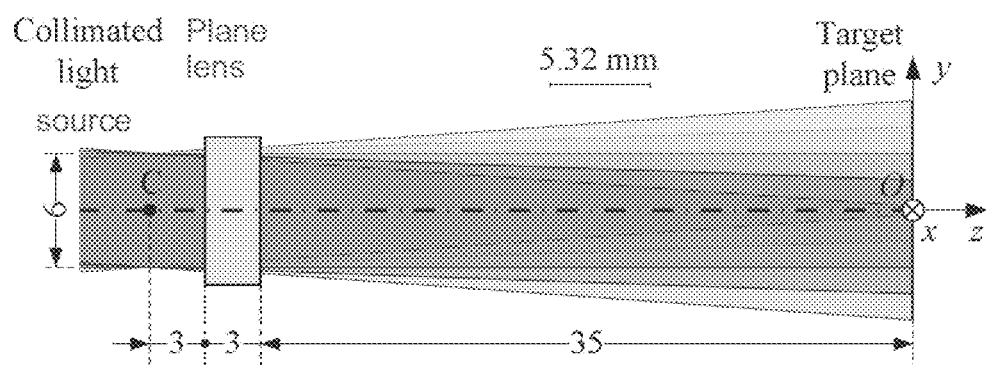
FIG. 3 is a schematic view of an initial system established in the method for designing the illumination system with freeform surface.

In step (S2), referring FIG. 3, the initial system is a coaxial system defining an optical axis. A rectangular coordinate system O-xyz is built wherein xOy plane is coincident with the target plane and z-axis is coincident with the optical axis. The whole initial system is symmetric about both the xOz plane and the yOz plane.

The plurality of collimated light sources are configured to emit collimated beams. Each of the collimated beams has a circular cross-section. Each of collimated beams has a Gaussian intensity distribution across its circular cross-section. The collimates beams pass through the plane lens to the target plane. A center of collimated beam with maximum intensity always passes through a fixed point C. The fixed point C is located in the optical axis between the collimated light sources and the plane lens. The fixed point C is three millimeters away from the plane lens. A light intensity of edge of the collimated beam with maximum intensity drops to 20% of the maximum intensity. An intensity distribution of each collimated light sources in its circular cross-section can be expressed as by a formula of:

$$I(r) = \begin{cases} I_0 \exp\left(-\frac{\ln 5}{9} r^2\right), & r \leq 3 \text{ mm} \\ 0, & r > 3 \text{ mm} \end{cases} \quad (1)$$

wherein, $I_0$ is a maximum intensity at the center of the collimated beam; r is a radial distance away from the center of the collimated beam.

The plurality of collimated light sources have the same parameters, such as size, shape and other photometric characteristics. The plurality of collimated light sources are located in a same plane. The plurality of collimated light sources are evenly distributed in an angle field. The angle field can be selected from 4° (horizontal)×8° (vertical), 6° (horizontal)×12° (vertical) or 8° (horizontal)×16° (vertical). In some embodiments, a number of the collimated light sources can be ranged from 2 to 15. In one embodiment, the initial system comprises fifteen collimated light sources. A diameter of the collimated light source is 6 millimeters.

Figure 4:
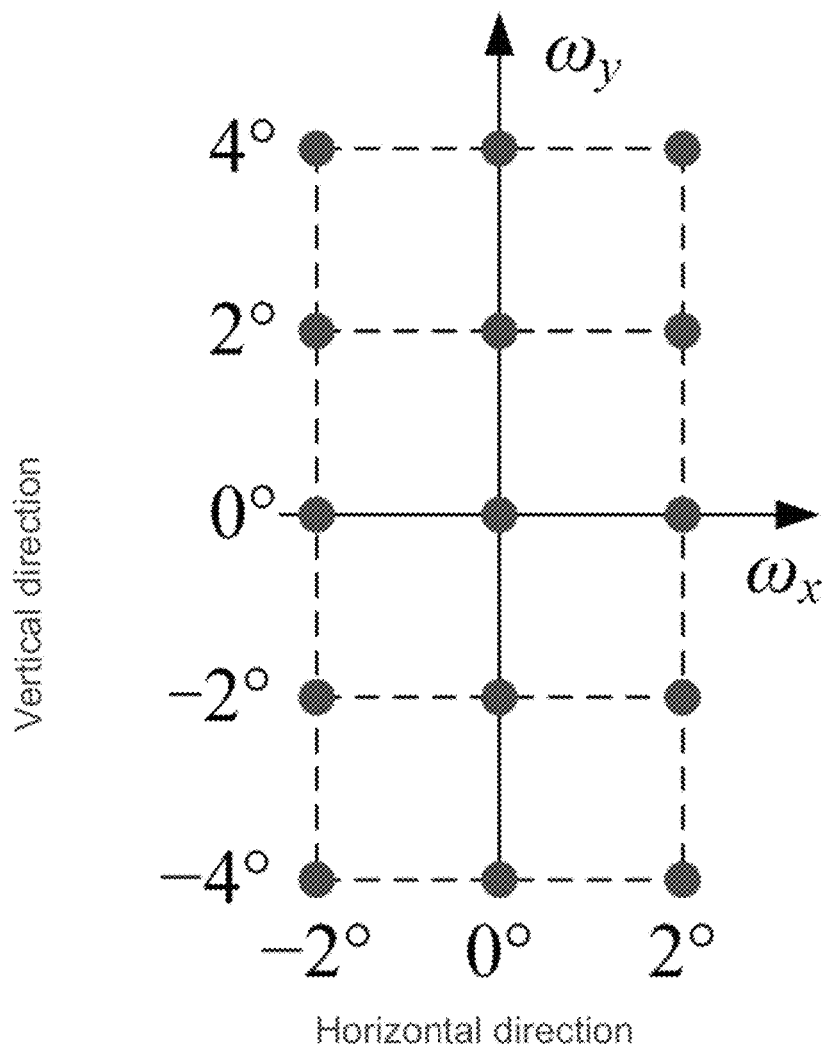
FIG. 4 is a distribution schematic view of fifteen collimated light sources in the initial system.
Figure 5:
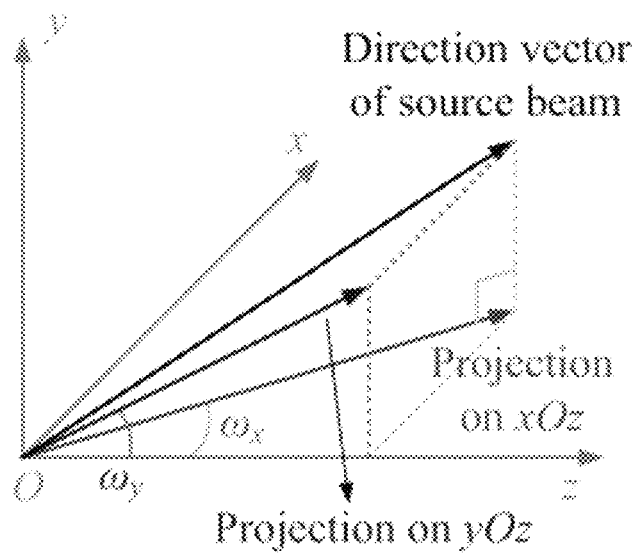
FIG. 5 is a schematic view of the direction vector projection of ray located in (0°, 0°) in the FIG. 4.

Directions of the plurality of collimated light sources are different. A direction distribution of the plurality of collimated light sources is shown in FIG. 4. The central collimated light source is located at the direction of (0°, 0°). A directional difference between each two adjacent collimated light sources is 2°. Referring FIG. 5, the direction of collimated light sources can be expressed by $\omega_x$ or $\omega_y$. The $\omega_x$ or $\omega_y$ is an angle between the z-axis and the projection of the direction vector of the collimated beam on the xOz plane or the yOz plane.

The plane lens is located between the collimated light sources and the target plane. The plane lens defines two parallel planes. The two parallel planes comprise a first plane and a second plane. In one embodiment, the plane lens is a flat glass plate, wherein a thickness of the flat glass plate is 3 millimeters and a refractive index of the flat glass plate is 1.59. A distance between the flat glass plate and the target plane is 35 millimeters.

The target plane is configured to form light spots. A position of the light spots on the target plane linearly depends on the direction of the collimated light sources. The position of light spots on the target plane can be expressed as:

$$\begin{cases} x(\text{mm}) = a\omega_x \\ y(\text{mm}) = a\omega_y \end{cases}, \quad (2)$$

wherein, (x, y) is a vertical and horizontal ordinate of the center of each light spots; a is a coefficient, the coefficient a is not limited. In one embodiment, the position of light spots on the target plane can be express as:

$$\begin{cases} x(\text{mm}) = 0.64 \times \omega_x, & \omega_x = 0°, \pm 2° \\ y(\text{mm}) = 0.64 \times \omega_y, & \omega_y = 0°, \pm 2°, \pm 4° \end{cases}, \quad (3)$$

In step (S3), a sphere lens is designed according to the expected light spots. In the design process, the positional relationship between the collimated light source, the plane lens and the target plane remains unchanged, and the thickness of the plane lens remains unchanged. A curvature radius of the sphere lens is calculated. The sphere lens comprises a first sphere and a second sphere. A method for calculating the curvature radius of the sphere lens comprises the following sub-steps:

step (a), selecting two feature rays in two different collimated light sources, wherein the two feature rays pass through the sphere lens to form a target point A and a target point B on the target plane;

step (b), obtaining a y-coordinate of the target point A and a y-coordinate of the target point B by the parameters of the expected light spots;

step (c), calculating the curvature radius of the first sphere and the second sphere based on an iterative optimization algorithm and the y-coordinate of the target point A and the target point B.

In step (b), as the positional relationship between the collimating light source, the plane lens and the target plane remains unchanged, the y-coordinate of the point A and the point B depend on a curvature radius $r_1$ of the first sphere and a curvature radius $r_2$ of the second sphere. Therefore, the curvature radius $r_1$ of the first sphere and the curvature radius $r_2$ of the second sphere can be calculated by the y-coordinate of the point A and the y-coordinate of the point B.

Figure 6:
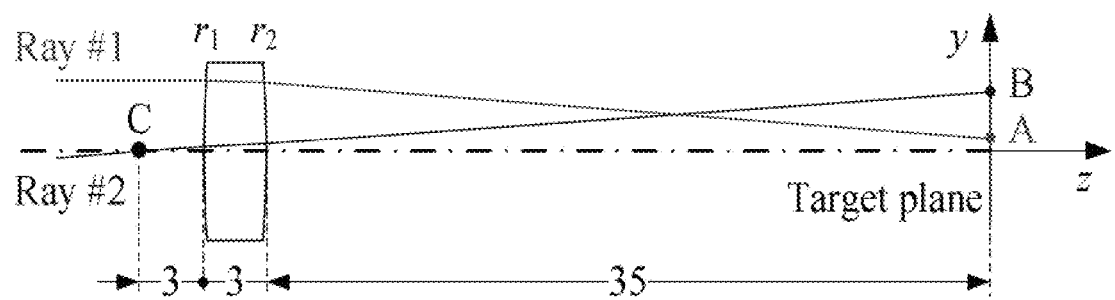
FIG. 6 is a light path schematic view for obtaining a curvature radius of sphere lens in the method for designing the illumination system with freeform surface.

In one embodiment, referring FIG. 6, the two feature rays are defined as ray #1 and ray #2. The ray #1 is an edge ray of a center light source. The center light source is located in the direction of (0°,0°). The ray #2 is a center ray of a light source. The light source is located in the direction of (0°,4°). The ray #1 corresponds to the target point A on the target plane. The ray #2 corresponds to the target point B on the target plane.

According to the diameter of the expected light spot is one millimeter, and the distance between adjacent expected light spots is 1.28 millimeters, a y-coordinate of the point A and the point B are obtained. The y-coordinate of the point A is 0.5 millimeter. The y-coordinate of the point B is 2.56 millimeters. The curvature radius $r_1$=50.623 millimeters of the first sphere and the curvature radius $r_2$=−50.774 millimeters of the second sphere are obtained by an iterative optimization algorithm and the y-coordinate of the point A and the point B. The design of the sphere lens is finished.

The plane lens is replaced by the sphere lens wherein the first sphere is used to replace the first plane and the second sphere is used to replace the second plane. The light spots formed by the sphere lens fail to reach the illumination effect of the expected light spot, and needs further improvement. The before-construction-iteration illumination system is used as an initial construction-iteration system. The before-construction-iteration illumination system comprises a plurality of collimated light sources, a sphere lens and a target plane.

Figure 7:
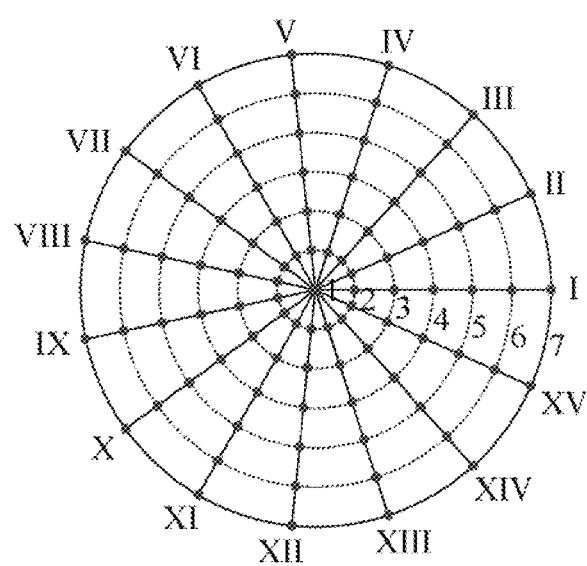
FIG. 7 is a schematic view of sampling a plurality of feature rays using a polar grid in a circular cross-section of a collimated light source in FIG. 3.

In step (S4), a plurality of target points need to be determined before building a freeform surface lens. A plurality of feature rays of each of the plurality of collimated light sources are selected by a coordinate grid. The coordinate grid defines N grid points on the cross section of the collimated light sources, wherein one grid point corresponds to one feature ray. The coordinate grid can be a rectangular coordinate grid, a polar coordinate grid or others. In one embodiment, the plurality of feature rays are selected by a polar coordinates grid. Referring FIG. 7, the polar coordinates grid is divided into an angular grid and a radial grid. The angular grid is divided into fifteen equal parts. The radial grid is divided into seven equal parts. Each of the plurality of collimated light sources defines 91 feature rays. The fifteen collimated light sources defines 1365 feature rays.

The feature rays irradiate to the target plane through the sphere lens. A plurality of the target points corresponding to the feature rays are formed on the target plane. A method for obtaining the plurality of target points comprises the following sub-steps:

step (41), obtaining a ray-mapping relationship of the collimated light source in the direction of (0°,0°) based on a energy conservation law, $$\begin{cases} R = \frac{\sqrt{5}}{4}\sqrt{1 - \exp\left(-\frac{\ln 5}{9}r^2\right)}, & r \le 3 \text{ mm} \\ \varphi = \theta \end{cases} \Rightarrow \begin{cases} x = R\cos\varphi \\ y = R\sin\varphi \end{cases} \quad (4)$$

Wherein, (r, θ) is a polar coordinates of a feature ray on the cross-section of the collimated light sources; (R, φ) is a polar coordinates of the feature ray on the target plane; (x, y) is a rectangular coordinate of the target point on the target plane.

step (42), obtaining the ray-mapping relationship of the collimated light source in other directions by equation (4) and equation (3), $$\begin{cases} x = R\cos\varphi + 0.64\omega_x, & \omega_x = 0°, \pm 2° \\ y = R\sin\varphi + 0.64\omega_y, & \omega_y = 0°, \pm 2°, \pm 4° \end{cases} \quad (5)$$

step (43), bringing the polar coordinate of the feature ray into the ray-mapping relationship of the collimated light source, and obtaining the rectangular coordinate of the plurality of target points corresponding to the feature rays.

In step (S5), based on the well-designed sphere lens and the plurality of target points, an initial freeform surface lens is constructed. The initial freeform surface lens is used to replace the sphere lens. The initial freeform surface lens is constructed based on the plurality of target points. A method for constructing the initial freeform surface lens comprises:

step (51), keeping the first sphere unchanged, and constructing a first freeform surface to replace the second sphere; and step (52), keeping the first freeform surface unchanged, and constructing a second freeform surface to replace the first sphere.

A method for constructing the first freeform surface and the second freeform surface comprises:

step (a), acquiring a plurality of intersections of the plurality of feature rays with a freeform surface to be measured, the plurality of intersections are a plurality of feature data points $P_i$ (i=1, 2 . . . K);

step (b), obtaining the first freeform surface or the second freeform surface by surface fitting the plurality of feature data points $P_i$ (i=1, 2 . . . K).

For a specific method for constructing the first freeform surface and the second freeform surface, please refers to the Patent US20160232718A1 published on Oct. 11, 2016. In the construction process with freeform surface, some additional constraints are introduced to ensure that the position relationship of all elements in the initial system and the thickness of the plane lens remain unchanged, such as the first feature data point is located at the z-axis, etc.

The above well-constructed freeform surface lens is used to replace the sphere lens to form a before-construction-iteration system, which beams pass through the initial freeform surface lens to form the plurality of light spots on the target plane. When the parameters of the plurality of light spots are same as the parameters of the plurality of expected light spots, the initial freeform surface lens can be used as a final freeform surface lens. But, when the parameters of the plurality of light spots are close to the parameters of the plurality of expected light spots, another freeform surface lens needs to further be constructed based on the initial freeform surface lens. In one embodiment, the shape and size of the plurality of light spots are close to the plurality of expected light spots, but the illuminance distribution of the plurality of light spots needs to be further improved. It is necessary to further construct a freeform surface lens by making multiple constructions-iterations. The term 'multiple constructions-iterations' refers to a process where a new freeform surface lens is constructed based on previous freeform surface lens and the previous freeform surface lens is replaced by the new freeform surface lens, then repeating this process. A method for making multiple constructions-iterations comprises the following sub-steps:

step (61), keeping the first freeform surface unchanged, and constructing a new freeform surface to replace the second freeform surface;

step (62), keeping the new freeform surface unchanged, and constructing another new freeform surface to replace the first freeform surface, and forming a middle-construction-iteration illumination system with freeform surface;

step (63), taking the middle-construction-iteration illumination system with freeform surface as an initial construction-iteration system, and repeating the step (61) to step (63) until the plurality of light spots formed by an after-construction-iteration illumination system with freeform surface are close to the plurality of expected light spots, the multiple constructions-iterations process is finished.

Figure 8:
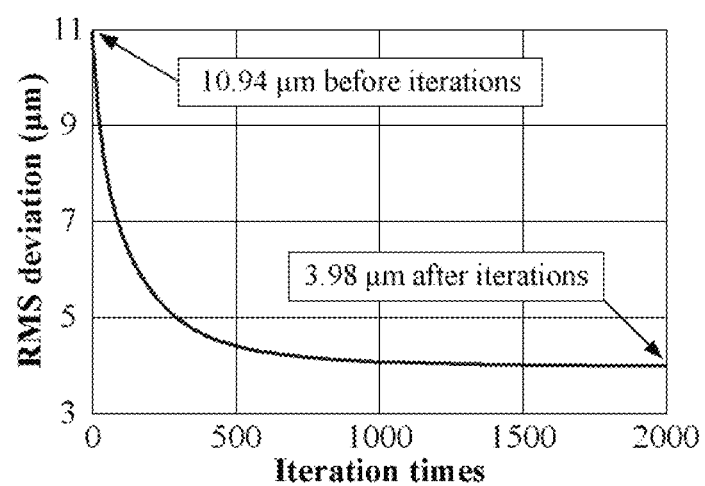
FIG. 8 is a relationship between an RMS value $\sigma_{RMS}$ of the distance between the ideal target points and the actual intersection of the plurality of feature rays with a target plane and the times of iteration process of one embodiment of the illumination system with freeform surface.

In step (63), the after-construction-iteration illumination system with freeform surface is obtained by 2000 times iteration of the middle-construction-iteration illumination system with freeform surface. Referring FIG. 8, average RMS deviation of the middle-construction-iteration illumination system with freeform surface is 10.94 Compared with the middle-construction-iteration illumination system with freeform surface, an average RMS deviation of the after-construction-iteration illumination system with freeform surface reduces to 3.98 μm and tends to be stable.

The RMS deviation value $\sigma_{RMS}$ of the distance between an ideal target points and an actual intersection of the plurality of feature rays with the target plane is used to describe the illumination effect. The smaller the $\sigma_{RMS}$, the better the illumination effect of the after-construction-iteration illumination system with freeform surface. The $\sigma_{RMS}$ can be expressed as by a formula of:

$$\sigma_{RMS} = \sqrt{\frac{\sum_{i=1}^{K} \sigma_i^2}{K}} \quad (6)$$

wherein, K is the number of the feature rays, $\sigma_i$ is the distance between the ideal target points and the actual intersection of the $i^{th}$ feature ray. When the $\sigma_{RMS}$ tends to be stable and remains unchanged, the construction-iteration process ends.

The after-construction-iteration illumination system with freeform surface is configured to form expected light spots. The after-construction-iteration illumination system with freeform surface comprises a plurality of collimated light sources, a freeform surface lens and a target plane. The freeform surface lens comprises a first freeform surface and a second freeform surface. The equation of the first freeform surface and the second freeform surface can be expressed as follows:

$$z = \frac{c(x^2 + y2)}{1 + \sqrt{1 - (1+k)c^2(x^2 + y^2)}} + \sum_m \sum_n A_{mn} x^m y^n \quad (7)$$

Wherein, c is the curvature of the conic surface at the vertex, k is the conic constant, $A_{mn}$ represents the xy polynomials coefficient, m+n≥2 and both m and n are even. In one embodiment, the formula of the first freeform surface and the second freeform surface can be expressed as follows:

$$z = \frac{c(x^2 + y^2)}{1 + \sqrt{1 - (1+k)c^2(x^2 + y^2)}} + A_{20}x^2 + A_{02}y^2 + A_{40}x^4 + \\ A_{22}x^2y^2 + A_{04}y^4 + A_{60}x^6 + A_{42}x^4y^2 + A_{24}x^2y^4 + A_{06}y^6, \quad (8)$$

In one embodiment, the parameters of the freeform surface lens are shown in table 1 below.

TABLE 1 parameters of the freeform surface lens

| Parameters | First freeform surface | Second freeform surface |
|---|---|---|
| Radius of curvature r | 63.874 | −44.221 |
| Curvature c | 0.015656 | −0.022614 |
| K | 0 | 0 |
| $A_{20}$ | −0.0011693 | −0.00032837 |
| $A_{02}$ | −0.0016034 | −0.00077209 |
| $A_{40}$ | 0.00018524 | 0.000083801 |
| $A_{22}$ | 0.00033282 | 0.0001303 |

TABLE 1-continued parameters of the freeform surface lens

| Parameters | First freeform surface | Second freeform surface |
|---|---|---|
| $A_{04}$ | 0.00015549 | 0.000055055 |
| $A_{60}$ | −3.6922E−06 | −1.9259E−06 |
| $A_{42}$ | −7.4964E−06 | −2.0282E−06 |
| $A_{24}$ | −5.8951E−06 | −4.9745E−07 |
| $A_{06}$ | −1.6328E−06 | 1.2024E−07 |

Figure 9:
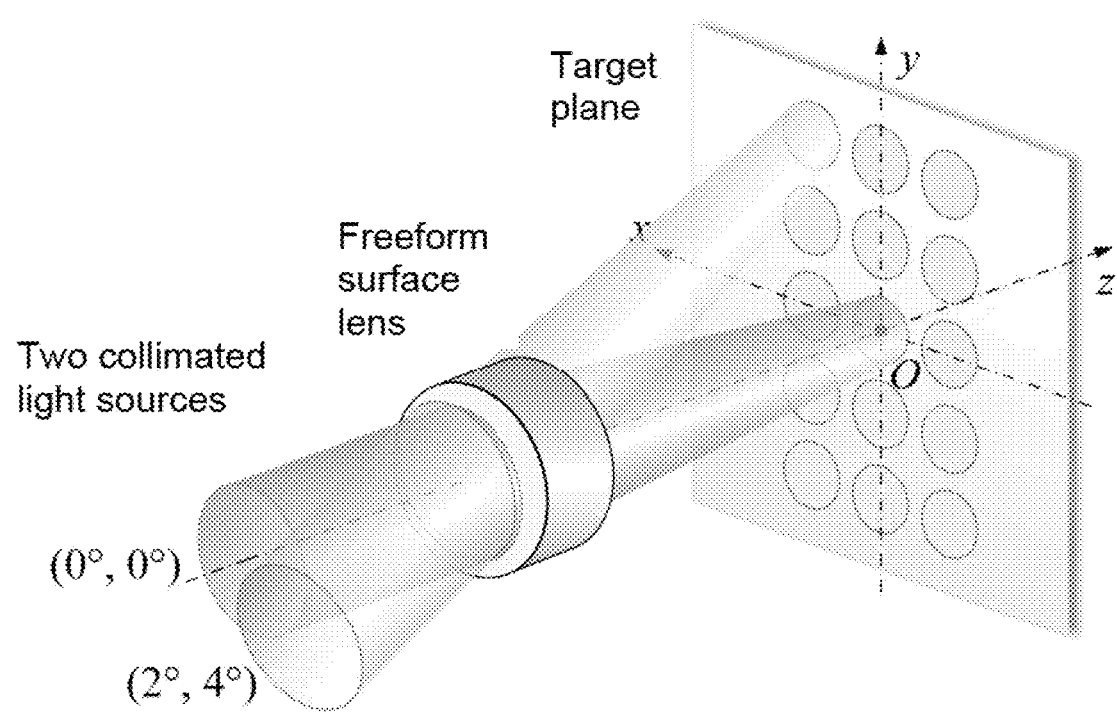
FIG. 9 is a schematic view of another embodiment of an illumination system with freeform surface.

Each parameter of the light spots formed by the after-construction-iteration illumination system with freeform surface are same as that of the expected light spots. The after-construction-iteration illumination system with freeform surface is shown in FIG. 9. It is showing that two light sources locating in direction of (0°, 0°) and (2°, 4°) of the after-construction-iteration illumination system with freeform surface are forming two light spots on the target plane by the freeform surface lens.

The method for designing illumination system with freeform surface can have many advantages. First, the method considers multiple same collimated light sources. When the direction of the collimated light sources is changed continuously, light spots formed by the collimated light sources moves continuously on the target plane, and the parameters of the light spots are keeping unchanged during the moving process. And the method can form various light spot arrays, wherein the number of the light spots are equal to the number of the collimated light sources.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:
1. A method for designing an illumination system with freeform surface, the method comprising:
   step (S1), presupposing a plurality of expected light spots;
   step (S2), establishing an initial system, wherein the initial system comprises a plurality of collimated light sources, a plane lens and a target plane;
   step (S3), replacing the plane lens with a sphere lens to obtain a before-construction-iteration illumination system, wherein a plurality of rays emitted by the plurality of collimated light sources passes through the sphere lens to the target plane;
   step (S4), selecting a plurality of feature rays in the rays, and obtaining a plurality of target points corresponding to the plurality of feature rays based on a ray-mapping relationship between the plurality of collimated light sources and the target plane; and
   step (S5), taking the before-construction-iteration illumination system obtained in step (S3) as an initial construction-iteration system, and obtaining an after-construction-iteration illumination system with freeform surface by making multiple constructions-iterations based on the plurality of target points in step (S4); wherein the after-construction-iteration illumination system with freeform surface comprises a freeform surface lens, the freeform surface lens comprises a first freeform surface and a second freeform surface, an equation of the first freeform surface and the second freeform surface is:

$$z = \frac{c(x^2 + y^2)}{1 + \sqrt{1 - (1+k)c^2(x^2 + y^2)}} + A_{20}x^2 + A_{02}y^2 + A_{40}x^4 +$$
$$A_{22}x^2y^2 + A_{04}y^4 + A_{60}x^6 + A_{42}x^4y^2 + A_{24}x^2y^4 + A_{06}y^6,$$

wherein, c represents surface curvature at the vertex, k represents conic constant, $A_{20}$, $A_{02}$, $A_{40}$, $A_{22}$, $A_{04}$, $A_{60}$, $A_{42}$, $A_{24}$, $A_{06}$ represent coefficients; c=0.015656, K=0, $A_{20}$=−0.0011693, $A_{02}$=−0.0016034, $A_{40}$=0.00018524, $A_{22}$=0.00033282, $A_{04}$=0.00015549, $A_{60}$=−3.6922E-06, $A_{42}$=−7.4964E-06, $A_{24}$=−5.8951E-06, $A_{06}$=−1.6328E-06 in the equation of the first freeform surface;

the sphere lens comprises a first sphere surface and a second sphere surface, the step (S5) further comprises a method for making multiple constructions-iterations comprising:

step (61), keeping the first sphere surface unchanged, and constructing an initial freeform surface to replace the second sphere surface;

step (62), keeping the initial freeform surface unchanged, and constructing another new freeform surface to replace the first sphere surface, and forming a middle-construction-iteration illumination system with freeform surface; and step (63), taking the middle-construction-iteration illumination system with freeform surface as an initial construction-iteration system, and repeating the step (61) to step (63) until a plurality of light spots formed by the after-construction-iteration illumination system with freeform surface are equal to the plurality of expected light spots, and the multiple constructions-iterations process is finished.

2. The method of claim 1, wherein the plurality of expected light spots have a same size and a same shape.

3. The method of claim 1, wherein the initial system is a coaxial system defining an optical axis, and a rectangular coordinate system O-xyz is built wherein xOy plane is coincident with the target plane and z-axis is coincident with the optical axis.

4. The method of claim 1, wherein the plurality of collimated light sources are located in a single plane.

5. The method of claim 1, wherein in the step (S2), the plane lens is located between the plurality of collimated light sources and the target plane.

6. The method of claim 1, wherein the step (S3) further comprises a method for calculating a curvature radius of the sphere lens comprising:

step (a), selecting two feature rays from the plurality of rays, wherein the two feature rays corresponds to a target point A and a target point B on the target plane;

step (b), obtaining a y-coordinate of the target point A and the target point B by the parameters of the expected light spot; and step (c), obtaining the curvature radius of the sphere lens based on an iterative optimization algorithm and the y-coordinate of the target point A and the target point B.

7. The method of claim 1, wherein after the plane lens is replaced by the sphere lens, the sphere lens is located between the plurality of collimated light sources and the target plane.

8. The method of claim 1, wherein the step (S5) further comprises a method for constructing the first freeform surface and the second freeform surface comprising:

step (a), acquiring a plurality of intersections of the plurality of feature rays with a freeform surface to be measured, the plurality of intersections are a plurality of feature data points $P_i$ (i=1, 2 ... K); and step (b), obtaining the first freeform surface and the second freeform surface by surface fitting the plurality of feature data points $P_i$ (i=1, 2 ... K).

9. The method of claim 8, wherein a first feature data point is located at an optical axis.

10. The method of claim 1, wherein a curvature radius of the first freeform surface is 63.874 mm, and a curvature radius of the second freeform surface is −44.221 mm.

11. The method of claim 1, wherein c=−0.022614, K=0, $A_{20}$=−0.00032837, $A_{02}$=−0.00077209, $A_{40}$=0.000083801, $A_{22}$=0.0001303, $A_{04}$=0.000055055, $A_{60}$=−1.9259E-06, $A_{42}$=−2.0282E-06, $A_{24}$=−4.9745E-07, $A_{06}$=1.2024E-07 in the equation of the second freeform surface.

12. The method of claim 1, wherein the number of the plurality of collimated light sources ranges from 2 to 15.

13. The method of claim 1, wherein the plurality of collimated light sources are located in an angle field, and the angle field is selected from 4° (horizontal)×8° (vertical), 6° (horizontal)×12° (vertical) or 8° (horizontal)×16° (vertical) angle field.

14. The method of claim 1, wherein an RMS deviation value $\sigma_{RMS}$ of the distance between an ideal target point and an actual intersection of the plurality of feature rays with the target plane is used to evaluate illumination effect of the after-construction-iteration illumination system with freeform surface, which is expressed by a formula of:

$$\sigma_{RMS} = \sqrt{\frac{\sum_{i=1}^{K} \sigma_i^2}{K}}$$

wherein, K is the number of the feature rays, $\sigma_i$ is the distance between the ideal target points and the actual intersection of the $i^{th}$ feature ray.

15. The method of claim 14, wherein the smaller the $\sigma_{RMS}$, the better the illumination effect of the after-construction-iteration illumination system with freeform surface.

16. A method for designing an illumination system with freeform surface, the method comprising:

step (S1), presupposing a plurality of expected light spots;

step (S2), establishing an initial system, wherein the initial system comprises a plurality of collimated light sources, a plane lens and a target plane; and the plane lens is located between the plurality of collimated light sources and the target plane;

step (S3), replacing the plane lens with a sphere lens to obtain a before-construction-iteration illumination system, wherein a plurality of rays emitted by the plurality of collimated light sources passes through the sphere lens to the target plane;

step (S4), selecting a plurality of feature rays in the rays, and obtaining a plurality of target points corresponding to the plurality of feature rays based on a ray-mapping relationship between the plurality of collimated light sources and the target plane; and step (S5), taking the before-construction-iteration illumination system obtained in step (S3) as an initial construction-iteration system, and obtaining an after-construction-iteration illumination system with freeform surface by making multiple constructions-iterations based on the plurality of target points in step (S4);

wherein the after-construction-iteration illumination system with freeform surface comprises a freeform surface lens, the freeform surface lens comprises a first freeform surface and a second freeform surface, an equation of the first freeform surface and the second freeform surface is:

$$z = \frac{c(x^2 + y^2)}{1 + \sqrt{1 - (1+k)c^2(x^2 + y^2)}} + A_{20}x^2 + A_{02}y^2 + A_{40}x^4 + A_{22}x^2y^2 + A_{04}y^4 + A_{60}x^6 + A_{42}x^4y^2 + A_{24}x^2y^4 + A_{06}y^6,$$

wherein, c represents surface curvature at the vertex, k represents conic constant, $A_{20}$, $A_{02}$, $A_{40}$, $A_{22}$, $A_{04}$, $A_{60}$, $A_{42}$, $A_{24}$, $A_{06}$ represent coefficients; c=−0.022614, K=0, $A_{20}$=−0.00032837, $A_{02}$=−0.00077209, $A_{40}$=0.000083801, $A_{22}$=0.0001303, $A_{04}$=0.000055055, $A_{60}$=−1.9259E-06, $A_{42}$=−2.0282E-06, $A_{24}$=−4.9745E-07, $A_{06}$=1.2024E-07 in the equation of the second freeform surface;

the sphere lens comprises a first sphere surface and a second sphere surface, the step (S5) further comprises a method for making multiple constructions-iterations comprising:

step (61), keeping the first sphere surface unchanged, and constructing an initial freeform surface to replace the second sphere surface;

step (62), keeping the initial freeform surface unchanged, and constructing another new freeform surface to replace the first sphere surface, and forming a middle-construction-iteration illumination system with freeform surface; and step (63), taking the middle-construction-iteration illumination system with freeform surface as an initial construction-iteration system, and repeating the step (61) to step (63) until a plurality of light spots formed by the after-construction-iteration illumination system with freeform surface are equal to the plurality of expected light spots, and the multiple constructions-iterations process is finished.

17. The method of claim 16, wherein c=0.015656, K=0, $A_{20}$=−0.0011693, $A_{02}$=−0.0016034, $A_{40}$=0.00018524, $A_{22}$=0.00033282, $A_{04}$=0.00015549, $A_{60}$=−3.6922E-06, $A_{42}$=−7.4964E-06, $A_{24}$=−5.8951E-06, $A_{06}$=−1.6328E-06 in the equation of the first freeform surface.

* * * * *